United States Patent
Owens et al.

(10) Patent No.: US 12,498,432 B2
(45) Date of Patent: Dec. 16, 2025

(54) MAGNETO-OPTICAL SENSOR FOR MAGNETIC FIELD MEASUREMENT

(71) Applicant: National Technology & Engineering Solutions of Sandia, LLC, Albuquerque, NM (US)

(72) Inventors: Israel Owens, Albuquerque, NM (US); Andrew Charles Biller, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 181 days.

(21) Appl. No.: 18/508,794

(22) Filed: Nov. 14, 2023

(65) Prior Publication Data

US 2024/0272244 A1 Aug. 15, 2024

Related U.S. Application Data

(60) Provisional application No. 63/445,830, filed on Feb. 15, 2023.

(51) Int. Cl.
*G01R 33/032* (2006.01)
*G01R 15/24* (2006.01)

(52) U.S. Cl.
CPC ....... *G01R 33/0322* (2013.01); *G01R 15/246* (2013.01)

(58) Field of Classification Search
CPC . G01R 33/0322; G01R 33/032; G01R 15/246
See application file for complete search history.

(56) References Cited

U.S. PATENT DOCUMENTS

| | | | | |
|---|---|---|---|---|
| 5,818,626 A * | 10/1998 | Engstrom | ............... | G02F 1/093 359/489.08 |
| 7,671,990 B1 * | 3/2010 | Adel | ............... | G03F 7/70683 356/400 |
| 7,952,711 B1 * | 5/2011 | Chen | ............... | G01N 21/23 356/365 |
| 2004/0056655 A1 * | 3/2004 | Sekijima | ............... | G01R 33/0322 324/96 |
| 2013/0038324 A1 * | 2/2013 | Wu | ............... | G01R 33/032 324/244.1 |
| 2018/0003555 A1 * | 1/2018 | Yi | ............... | G02F 1/0136 |
| 2019/0011507 A1 * | 1/2019 | Yang | ............... | G02B 6/27 |
| 2020/0194955 A1 * | 6/2020 | Rotondaro | ............... | H01S 5/4043 |

(Continued)

OTHER PUBLICATIONS

Cruden, A. et al., "Optical Crystal Based Devices for Current and Voltage Measurement," IEEE Transactions on Power Delivery, 1995. vol. 10, pp. 1217-1223.

(Continued)

*Primary Examiner* — Dominic E Hawkins
(74) *Attorney, Agent, or Firm* — Kevin W. Bieg; Mario A. Burgarello (57) ABSTRACT

A magneto-optical sensor can be used to measure electrical current with a very narrow pulse width as sensed by the magnetic field in the transmission line region of a pulsed power accelerator. Pulsed power accelerator experimental results agreed remarkably well with the Faraday effect theory, device physical model, and reference electrical current shunt data.

9 Claims, 5 Drawing Sheets

(56) References Cited

U.S. PATENT DOCUMENTS

2020/0309679 A1* 10/2020 Seko .................... G01N 21/21
2020/0348371 A1* 11/2020 Ismaeel ................ G02F 1/093

OTHER PUBLICATIONS

Liu, C. et al., "Applications of magneto-strictive, magneto-optical, magnetic fluid materials in optical fiber current sensors and optical fiber magnetic field sensors: A review," Optical Fiber Technology, 2021, vol. 65, 102634.

Owens, I. et al., "Electro-Optical Measurement of Electric Fields for Pulsed Power Systems," 2019 IEEE Pulsed Power & Plasma Science (PPPS), pp. 1-4.

Owens, I. et al., "Electro.optical measurement of intense electric field on a high energy pulsed power accelerator," Science Reports, 2021, vol. 11, 10702.

Owens, I. et al., "Magneto-optical measurement of magnetic field and electrical current on a short pulse high energy pulsed power accelerator," AIP Advances, 2023, vol. 13, 105006.

Smith, A. M., "Polarization and magnetooptic properties of single-mode optical fiber," Applied Optics, 1978, vol. 17, pp. 52-56.

* cited by examiner

MAGNETO-OPTICAL SENSOR FOR MAGNETIC FIELD MEASUREMENT

CROSS-REFERENCE TO RELATED APPLICATIONS

This application claims the benefit of U.S. Provisional Application No. 63/445,830, filed Feb. 15, 2023, which is incorporated herein by reference.

FEDERALLY SPONSORED RESEARCH AND DEVELOPMENT

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102(b)(1)(A): Israel Owens, Sean Coffey, Ben Ulmen, Richard K. Harrison, Alex Trujillo, Elaine Rhoades, Brandon McCutcheon, and Chris Grabowski, "Magneto-optical measurement of magnetic field and electrical current on a short pulse high energy pulsed power accelerator," *AIP Advances* 13, 105006 (2023). The subject matter of this disclosure was conceived of or invented by the inventors named in this application.

BACKGROUND OF THE INVENTION

Electrical currents and magnetic fields generated in high energy experiments are key operating parameters. Experiments involving plasmas, particle beams, studies of materials in high magnetic fields (warm dense matter), and the development of pulsed power accelerators used to drive these, and other experiments often require measurements of large-amplitude, pulsed currents. Conventional metallic-based magnetic field sensors, such as B-dot probes and Rogowski coils, rely on precision calibration and measure derivative field responses requiring integration or other non-linear post-processing of the sensor signal to obtain a measurement. See T. Huiskamp et al., *IEEE Sens. J.* 16(10), 3792 (2016); and T. Wagoner et al., *Phys. Rev. Special ST Accel. Beams* 11, 100401 (2008). Sensors such as current shunts can measure large electrical current without integrating time-derivative fields, but also require calibration and intrusive galvanic contact within the sensing region which often imposes unacceptable levels of electromagnetic noise on the probe signals as well as the current flow to be measured. See E. Thornton, *J. Phys. E: Sci. Instrum.* 3, 862 (1970).

A non-metallic based method for sensing magnetic fields and electrical current can be developed by utilizing the Faraday effect. See S. M. Smith, *Appl. Optics* 17, 52 (1978). Fiber optical sensors based on the Faraday-effect offer galvanic isolation, but often require the optical fiber to be wrapped around the current-carrying conductor under test to have sufficient path length for sensing the magnetic field. See L. Veeser, et. al., *Photonics: High Bandwidth Analog Applications* 648(6), 197 (1986); A. D. White et al., "Advances in Optical Fiber-Based Faraday Rotation Diagnostics," in *Proc. 10th IEEE Int. Pulsed Power Conf.*, pp. 1358-1363 (2009); G. Chen et al., *Sens. Actuators Rep.* 5, 100152 (2023); Y. Huang et al., *J. Light. Technol.* 39(7), 2187 (2021); and A. C. Zimmermann et al., *Proc. SPIE* 7753, 77535Q-1 (2011). A long path length of optical fiber as the primary sensing element is highly susceptible to physical damage as well as ionizing radiation induced optical noise and darkening of the fiber core materials rendering this method impractical for consistent operation in high energy environments. A promising approach, however, uses a bulk dielectric crystal fabricated from rare-earth elements. Such crystals allow one to measure intense magnetic fields with parameters such as the crystal length and operating wavelength defining system field sensitivity and dynamic range. In contrast with conventional sensors, a magneto-optical sensor (MOS) has a direct linear relationship between the optical signal from the sensor and the magnetic field to be measured, and the MOS response does not require external calibration or mathematical integration of the signal. See I. Owens et al., "Electro-Optical Measurement of Electric Fields for Pulsed Power Systems," in 2019 *IEEE Pulsed Power & Plasma Science (PPPS)*, pp. 1-4 (2019); and I. Owens et al., *Sci. Rep.* 11, 10702 (2021). A MOS utilizes dielectric materials to transmit, sense and receive optical signals to and from a remote data acquisition system. Optical fibers are only used to send and receive light to and from the dielectric crystal and are not a part of the active magnetic field sensing medium. The galvanic isolation inherent with dielectric materials is important as metallic-based sensing elements such as the conventional B-dot probes and current shunts are more prone to noise, improper electrical impedance matching configurations and signal reflections.

There is a dearth of literature on narrow pulse width magnetic field and high electric current measurements using bulk MOS crystals in high electromagnetic field and ionizing radiation environments. Cruden et al. describe an experiment to measure relatively large (>15 kA) electric current using a bulk dielectric crystal MOS at very low (<100 Hz) bandwidth. See A. Cruden et al., *IEEE Trans. Power Deliv.* 10(3), 1217 (1995). Cruden et al. reported high uncertainty and low signal-to-noise (SNR) in their electrical current measurements due to limitations in light source and detector technology. A comprehensive and contemporary review of various approaches to measure magnetic fields and electrical current using a magneto-optical approach as well as related methods and applications is given in Liu et al. See C. Liu et al., *Opt. Fiber Technol.* 65, 102634 (2021).

SUMMARY OF THE INVENTION

The present invention is directed to a magneto-optical sensor and method to measure the magnetic field driven by a narrow pulse width, high electrical current flow in the transmission line of a high energy pulsed power accelerator. The magnetic field and electrical current are amongst the most important operating parameters in a pulsed power accelerator and critical to understanding the properties of the radiation output. However, accurately measuring these fields and electrical currents using conventional pulsed power diagnostics is difficult due to the strength of ionizing radiation and electromagnetic interference. The method of the present invention uses a fiber coupled laser beam with a rare-earth element crystal sensor that is highly resistant to electromagnetic interference and does not require an external calibration.

BRIEF DESCRIPTION OF THE DRAWINGS

The detailed description will refer to the following drawings, wherein like elements are referred to by like numbers.

DETAILED DESCRIPTION OF THE INVENTION

The present invention is directed to a sensor and method to magneto-optically measure the magnetic field produced by a high electrical current pulse inside a pulsed power accelerator. As an example, the method is used to measure the narrow-pulse (<10 ns) magnetic field waveform produced by a 20-kA electrical current inside the vacuum transmission line of the Short Pulse High Intensity Nanosecond X-radiator (SPHINX) pulsed power accelerator at Sandia National Laboratories. SPHINX has a peak load voltage of 2 MV and is used to study the response of electronics to x-ray and electron environments. See N. R. Joseph et al., "Enhancements to the short pulse high intensity nanosecond X-radiator (SPHINX) pulsed power system," in 2015 *IEEE Pulsed Power Conference (PPC)*, pp. 1-5 (2015). Physical device theory, numerical calculations, and results from a laboratory experiment with a terbium gallium garnet (TGG) crystal are described to directly compare the SPHINX accelerator MOS experiment data to that of a conventional electrical current shunt.

MOS Device Theory and Physical Model

To determine the strength of the magnetic field in the SPHINX transmission line using a magneto-optical approach, the physical process can be described using the Faraday effect. See S. M. Smith, *Appl. Optics* 17, 52 (1978). Physically, the Faraday effect is a magneto-optical phenomena whereby the plane of polarization of light passing through a magnetized media is rotated, and the amount of rotation OR depends on the properties of the magnetized media, the wavelength of the light propagating, the intensity of the magnetic field, and the path length of the light in the media. By the Faraday effect, the polarization of a light beam propagating through a magneto-optical crystal will change linearly in proportion to the applied magnetic field.

Candidates for magneto-optical sensor materials include rare-earth-doped glasses and rare-earth garnet crystals that are transparent in the infrared or visible region. There are a total of 17 types of rare-earth elements, but the Faraday effect is strongest in materials that contain paramagnetic ions, such as $Ce^{3+}$, $Pr^{3+}$, $Tb^{3+}$, and $Dy^{3+}$. In particular, terbium gallium garnet (TGG) and yttrium iron garnet (YIG) are synthetic garnets with high Verdet constants which results in a strong Faraday effect. The Verdet constant of the crystal material is strongly dependent on wavelength with a weak dependence on temperature that is generally omitted. The Verdet constant within TGG is typically inversely proportional to the wavelength making visible light sources an ideal choice for further increasing Faraday rotation strength and decreasing sensor element size. Therefore, TGG is often used at wavelengths below 1100 nm due to its low absorption and high Verdet constant in the short wavelength range. A terbium-doped flint glass (crystal) of TGG was the material selected for use as the magneto-optical sensing element in the experiments described below. See David Vojna et al., *Appl. Sci.* 9(15), 3160 (2019).

The material property that describes the strength of the Faraday rotation is referred to as the Verdet constant $C_v(\lambda)$. With a fixed reference magnetic field B, crystal of length L and light source wavelength $\lambda$, the Verdet constant is determined by using the expression for the Faraday rotation angle:

$$\theta_R = C_v(\lambda) B L. \qquad (1)$$

Figure 1:
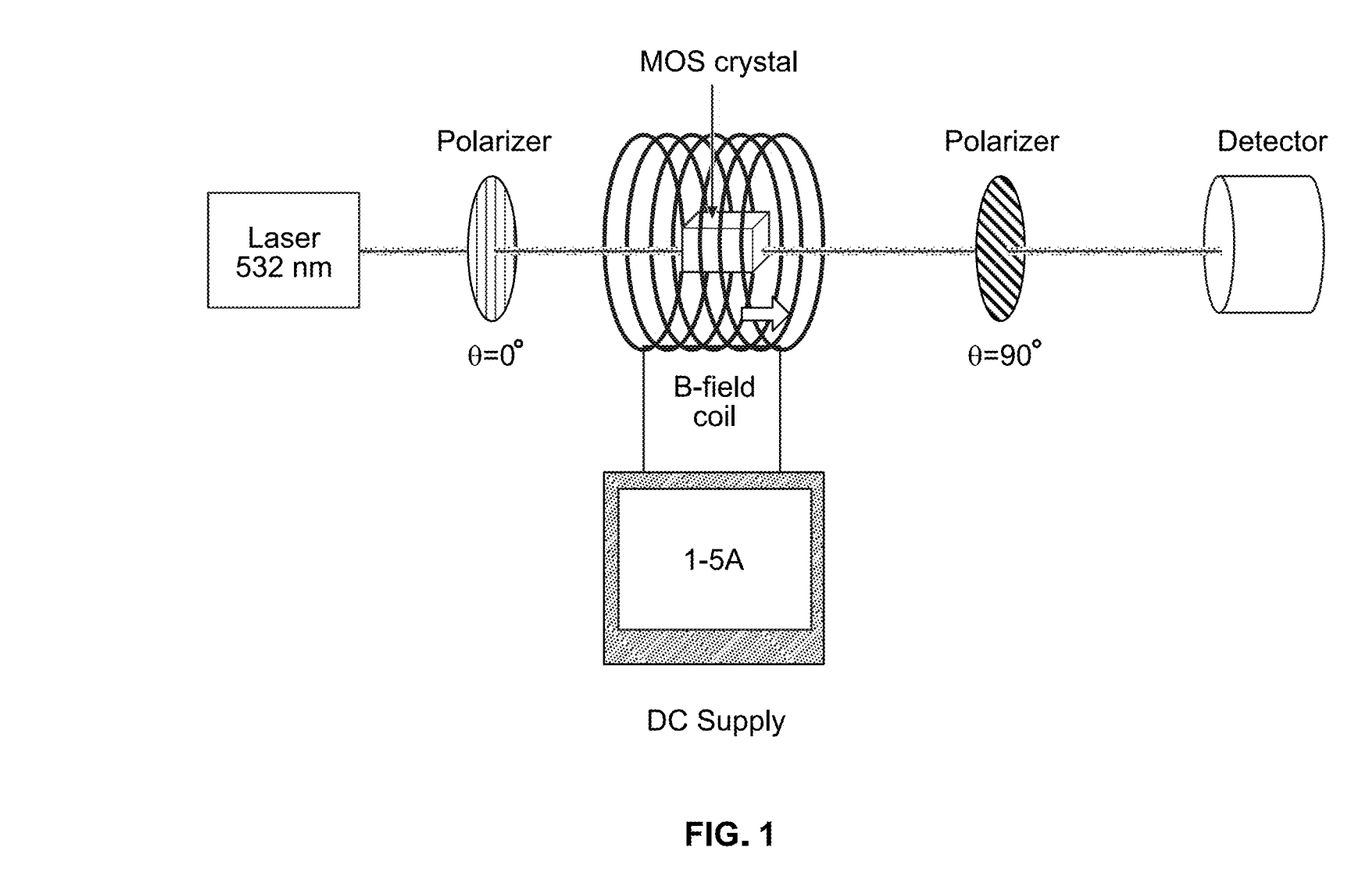
FIG. 1 is a schematic illustration of the MOS benchtop laboratory setup to measure the Verdet constant (190 rad/T/m) including a 532 nm fiber coupled laser, nanoparticle coated linear polarizers, terbium gallium garnet (TGG) MOS crystal, 55 mT magnetic field reference coil, 1-5 A DC current supply, and fiber coupled photodetector.

By placing a pair of crossed linear polarizers on both sides of the magneto-optical crystal, the polarization rotation can be transformed into a modulation of optical field intensity incident on a photodetector as shown in the MOS benchtop laboratory setup in FIG. 1. The intensity of optical light that passes through the second polarizer (analyzer) is proportional to the product of $\sin^2 \theta_R$ of the Faraday rotation angle and the initial (or parallel polarizer) light intensity. Using an applied magnetic field of 55 mT, 532 nm laser wavelength, crystal length of 20 mm and 12-degree analyzer rotation angle (to minimize intensity with applied magnetic field), a Verdet constant of 190 rad/T/m was determined for the TGG crystal.

The magnetic field of the SPHINX vacuum transmission line as generated by a cylindrical current carrying conductive surface can be modeled as:

$$B = \frac{\mu_0 I}{2\pi r} \qquad (2)$$

to be included in calculation of the expected Faraday rotation angle, system modulation voltage, magnetic field and electrical current. At a nominal SPHINX operating current of 18 kA and 0.09 m radial gap size r, the magnetic field within the transmission line is 40 mT at the center of the TGG crystal and along its 20 mm length (neglecting fringe effects and surface curvature). With a 40 mT field inside the TGG crystal, the Faraday rotation angle is calculated to be 9 degrees using Eq. (1).

The Faraday rotation angle is further related to the measured laser power levels by $$\theta_R \sim \sin^{-1} \sqrt{\frac{P_m}{P_{unc}}}. \qquad (3)$$

where $P_m$ represents the power transmitted through the polarizers with the applied magnetic field and $P_{unc}$ is the power with uncrossed polarizers. The full value of $P_{unc}$ is the product of the total initial applied laser power $P_i$ and overall transmission efficiency of the system $\eta_o$ which includes all optical component losses. Using the relation for the Faraday rotation angle and measured optical power, a complete expression for the SPHINX vacuum line electrical current $I_s$ as sensed by the generated magnetic field in terms of the peak modulation voltage output $V_m$ of a silicon photodetector measured on an oscilloscope is:

$$I_s = \frac{2\pi r}{\mu_0 C_v(\lambda) L} \sin^{-1} \sqrt{\frac{V_m}{V_d P_i \eta_o}}. \quad (4)$$

Using the expression for the sensed current in Eq. (4), and values $P_i$=15 mW for the initial applied low noise (<0.5% rms) laser power, $V_m$=60 mV for measured peak modulation voltage, $V_d$=7 V/mW is the detector output voltage per input optical power at 532 nm, $\eta_o$=2.3% for the system optical transmission, $C_v(\lambda)$=190 rad/T/m, TGG crystal length L=20 mm, r=0.09 m and $\mu_o$=4π×10$^{-7}$ T-m/A as the vacuum permeability of free space, then $I_s$=18.5 kA, consistent with the Faraday effect physical model, measured quantities from the experiment and expected electrical current produced by the SPHINX accelerator.

Magneto-Optical Sensor in Vacuum Transmission Line of Pulsed Power Accelerator

Figure 2:
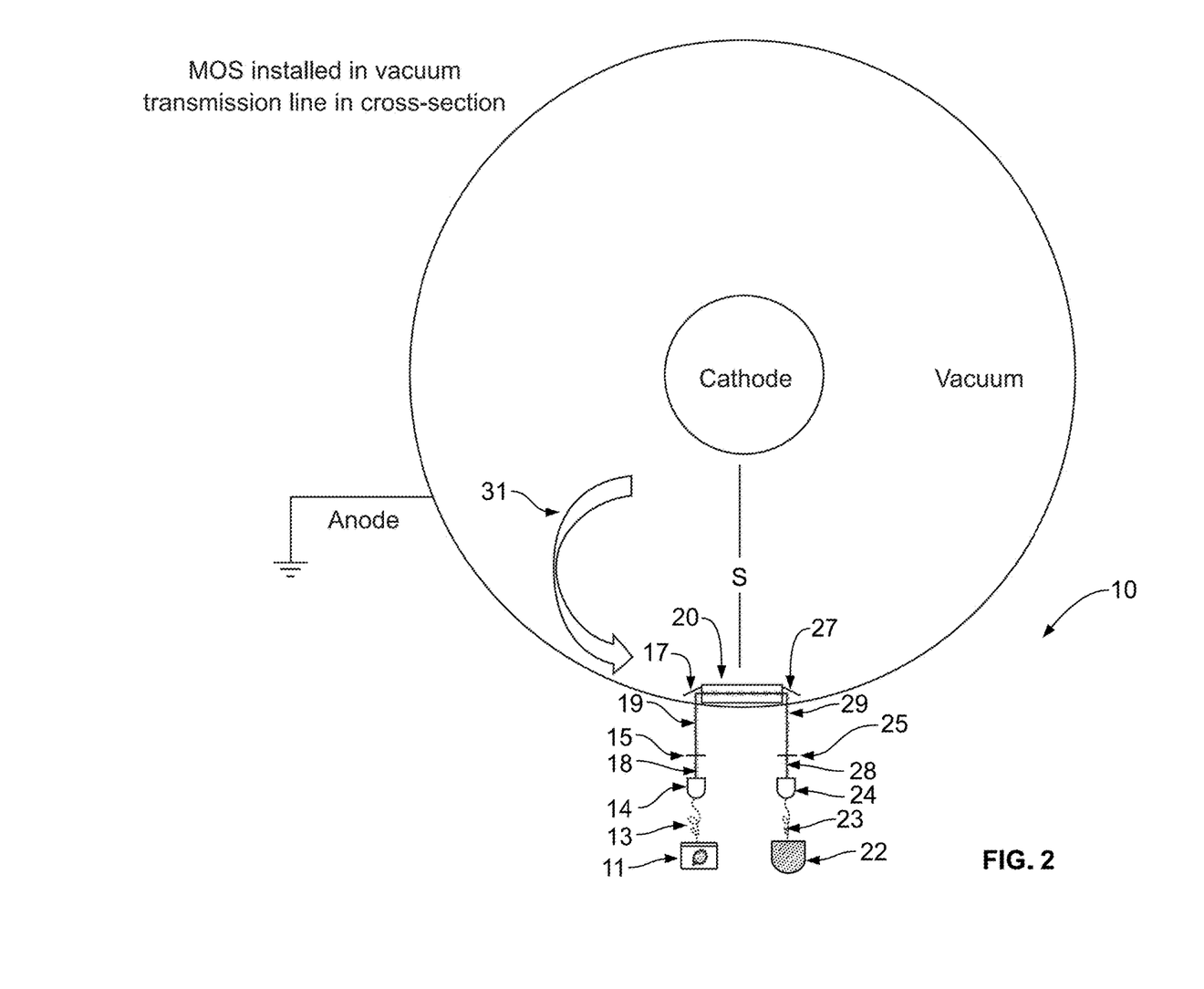
FIG. 2 is a schematic illustration of the MOS installed in the vacuum transmission line region of a pulsed power accelerator.

FIG. 2 is a cross-sectional schematic illustration of the MOS installed in the coaxial vacuum transmission line region of a pulsed power accelerator. The main components of this MOS setup 10 comprise a fiber-coupled laser 11, first and second collimating lenses 14 and 24, first and second linear polarizers 15 and 25, first and second turning mirrors 17 and 27, a magneto-optical material 20, and a photodetector 22. In general, the light source 11 can be a coherent laser light source, although a free space light emitting diode can also be used. Infrared or visible laser light can be used, depending on the magneto-optical material. The light from the laser 11 can be coupled into a single-mode fiber 13 which couples the light into the MOS via the first collimating lens 14. The input-coupled light 18 is then linearly polarized by the first linear polarizer 15. A first right-angle mirror 17 mounted on the anode then turns the linearly polarized light 19 through the magneto-optical material 20 along the direction of the optical axis of the crystal 20. The magnetic field 31 generated by the current flowing in the MITL is applied along the direction of propagation of the polarized light beam 19 passing through the magneto-optical material 20. The magnetic field 31 rotates the polarization of the linearly polarized light beam 19 passing through the magneto-optical material 20 depending on the strength of the Faraday effect. The magneto-optical material 20 can be any that produces a strong Faraday effect (i.e., has a large Verdet constant) and is optically transparent at the laser wavelength. The second right-angle mirror 27 redirects the rotated linearly polarized light 29 to a second linear polarizer 25 that can be aligned orthogonal to the first linear polarizer 15. If there is no magnetic field, no rotation of the polarized light beam occurs in the magneto-optical material 20 and, therefore, no light will be transmitted through the orthogonal second linear polarizer 25. Conversely, when the MOS material 20 is exposed to a magnetic field 31, the rotated light beam transmitted 28 through the second linear polarizer 25 contains an amplitude-modulated signal. The transmitted light 28 can be coupled out of the MOS via the second collimating lens 24 into a multi-mode fiber 23 to a photodetector 22 which measures the intensity of the transmitted light 28, thereby providing a time-resolved magnetic field measurement.

MOS SPHINX Accelerator Experiment

The main components of the exemplary MOS installed in the SPHINX accelerator consisted of a 15-mW continuous wave, single transverse mode, low-noise 532-nm fiber-coupled laser, a high-speed silicon photodetector, and a custom designed MOS housing to contain the 20 mm by 6 mm by 6 mm TGG crystal and the nano particle coated linear polarizers. TGG is a preferred material for the MOS crystal as it has a relatively high Verdet constant and robust physical properties. A high Verdet constant and Faraday rotation of the optical light polarization allows the sensor probe to be reduced in size (<25 mm) thereby minimizing unwanted interfering material in the sensing region.

The MOS was designed to allow independent in situ adjustment of the optical beam alignment, and light cross polarization within the contained stainless steel housing. The 532-nm laser light was coupled into a 25-meter long single-mode fiber where it is then directed through a set of right-angle mirrors, crossed polarizers, the MOS crystal and then coupled out of the MOS into a 25-meter-long multi-mode fiber to the high-speed photodetector. A 532 nm spectral bandpass filter was used to prevent stray light from reaching the photodetector. The right-angle mirrors directed the light through the sensing region of the MOS. The high polarization extinction ratio (100000:1) of the crossed polarizers enhances the signal-to-noise ratio (SNR) and serves as a baseline reference for the optical signal level. See I. Owens et al., "Electro-Optical Measurement of Electric Fields for Pulsed Power Systems," in 2019 *IEEE Pulsed Power & Plasma Science (PPPS)*, pp. 1-4 (2019); and I. Owens et al., *Sci. Rep.* 11, 10702 (2021).

For the SPHINX experiment, the essential device experimental parameters were the same as the benchtop laboratory setup used to determine the Verdet constant, but the MOS was placed in the harsh environment of a high energy pulsed power accelerator transmission line and exposed to substantially higher electromagnetic fields and ionizing radiation. The high electromagnetic field is applied across a vacuum diode and used to accelerate electrons into a high atomic number material (tantalum) target, thereby producing Bremsstrahlung radiation (x-rays) with energies up to 2.0 MeV. In considering the high energy environment challenges, the MOS was very carefully designed with minimal sensing components and material protrusion into the radial gap between the vacuum transmission line surface and ground.

The MOS sensing surface was aligned perpendicular with the axis of the transmission line and positioned flush with the anode's inner surface, placing it approximately S=9 cm from the cathode stalk. The side region of the transmission line is ideal for MOS placement as it is out of the direct path of the electron beam and x-ray radiation. As with the benchtop laboratory experiment, 532 nm light was coupled and directed through the MOS via long optical fibers. The laser, photodetector and measurement instrumentation were housed inside of a remote Faraday cage screen room. When the SPHINX accelerator shots were fired, a magnetic field was generated between the transmission line cathode stalk and anode which was measured by the MOS. Since the geometry of the transmission line is fixed for every shot, it is therefore possible to determine both the magnetic field and corresponding electrical current.

MOS SPHINX Experimental Results

In the discussion of the MOS waveforms that follow, a description and set of waveforms resulting from current shunt sensor are included for comparative analysis of the measured electrical current. The reference current monitor on SPHINX is a resistive current shunt comprised of a 12.7 μm thick stainless steel foil laser-welded to the housing. A twisted-pair lead is soldered to the foil and to a type N coaxial connector. A coaxial cable delivers the signal from the current shunt to an oscilloscope housed inside a screen room. A calibration and cable compensation factor for the signal voltage recorded on the scope determines the electrical current sensed by the resistive current shunt. The current shunt was positioned inside the vacuum transmission line along the same radial plane as the MOS. A single shot representative example of the normalized measured signal intensity for the MOS and current shunt is shown versus time in FIG. 3.

Figure 3:
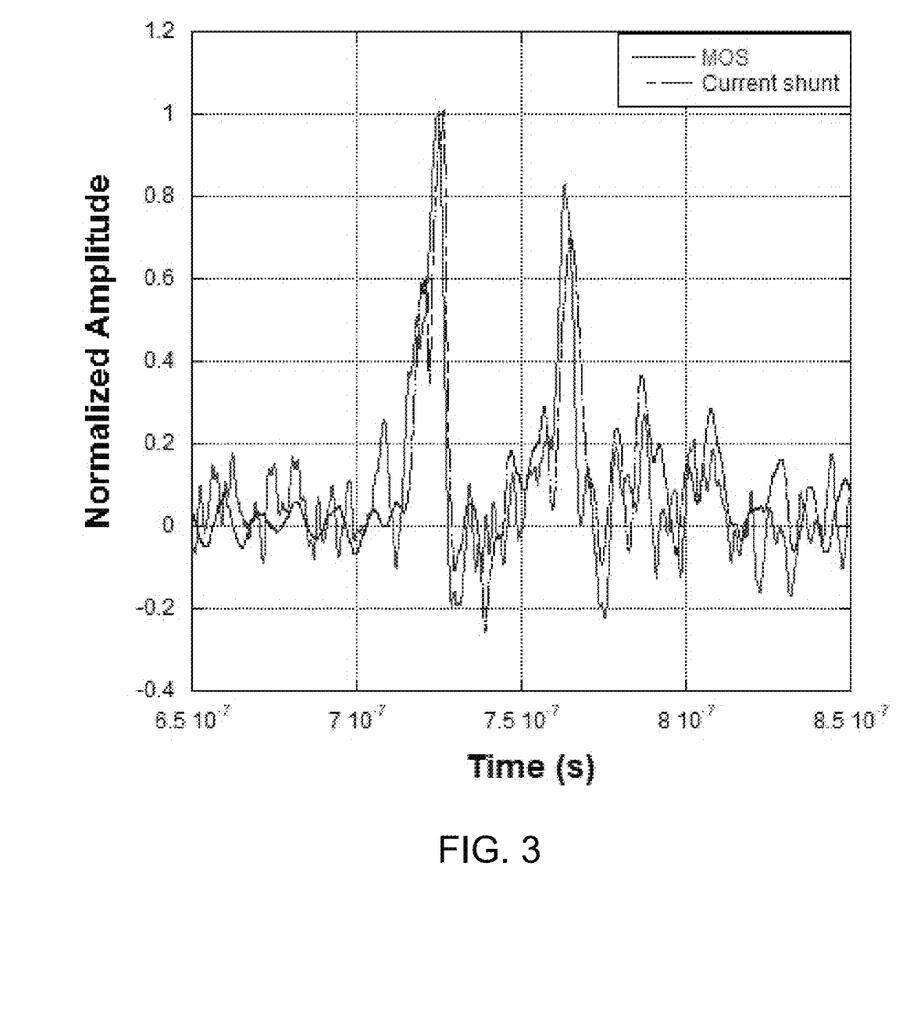
FIG. 3 is a graph showing MOS and current shunt normalized signal amplitude versus time for a single shot on the SPHINX pulsed power accelerator.
Figure 4:
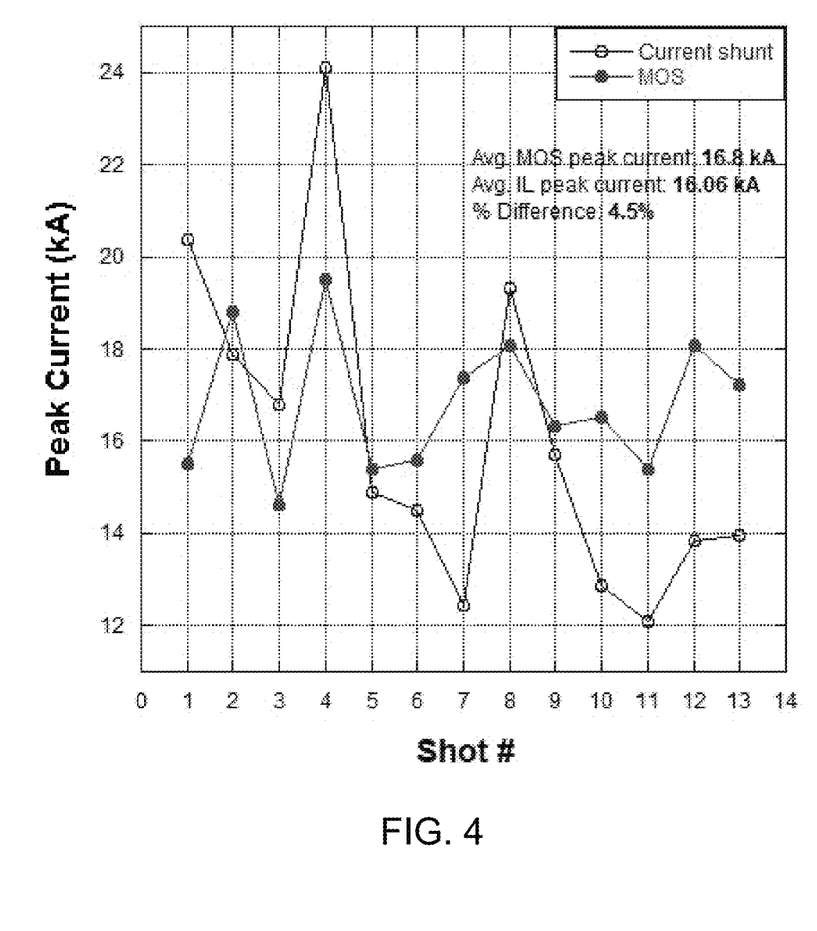
FIG. 4 is a graph of MOS and current shunt peak electrical current versus shot number for a series of 13 shots on the SPHINX pulsed power accelerator.
Figure 5:
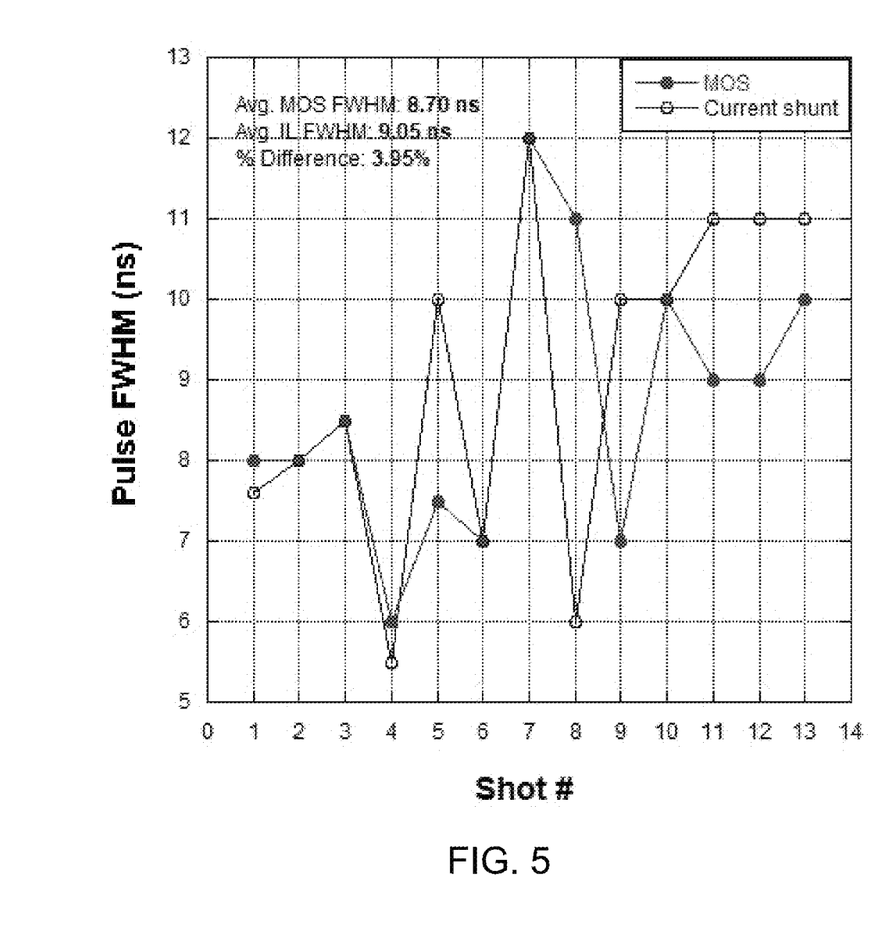
FIG. 5 is a graph of MOS and current shunt pulse FWHM versus shot number for a series of 13 shots on the SPHINX pulsed power accelerator. The pulse FWHM values were rounded to nearest 0.5 ns.

The fixed (crossed polarizer) DC light level incident on the photodetector was subtracted from the MOS signal to center the baseline with the current shunt signal, but the signal generated from the detector dark current was not removed. The MOS system resolution is only limited to the value of the detector dark current. The plot in FIG. 3 shows a remarkable similarity in comparing the overall electrical current signal waveform of the MOS to the reference current shunt. Although the peak SNR of the MOS was limited to an approximate 5:1 ratio by the available light intensity and transmission (<3.0%) of the optical components, it could be improved by simply utilizing a higher power laser. For quantitative comparison, the average MOS and current shunt peak electrical current pulse amplitudes and average pulse full width half maximums (FWHMs) are shown in FIGS. 4 and 5.

The average peak electrical current amplitude was 16.8 kA for the MOS and 16.08 kA for the current shunt. The average FWHM for the MOS was 8.7 ns and 9.05 ns for the current shunt. Even though there is shot-to-shot variation for both the MOS and current shunt, the percent difference for the average peak amplitude and FWHM is <5%. In particular, the relative percent differences for the average peak amplitude and FWHM were 4.5% and 3.5% respectively. The MOS showed less variation in the average peak amplitude and slightly narrower average pulse FHWM. The magneto-optical pulse from the MOS accurately reproduced the qualitative and quantitative features of the electrical current waveform as sensed through the generated magnetic field in the transmission line of SPHINX.

In addition to the results for the qualitative and quantitative aspects of the waveforms, the MOS showed robust performance in a challenging high energy operating environment. During the experiment, there was no sign of material damage or any decrease in quality of the vacuum of the transmission line. The optical fibers were outside of the vacuum transmission line and positioned far away from the most intense region of x-rays to reduce the possibility of unwanted ionizing radiation induced optical noise or fiber darkening. Thermal effects caused by changes in the TGG crystal temperature occur over a significantly larger time scale compared to the desired magneto-optical signal and had no interfering effect on the magnetic field and electrical current measurement.

The pulsed power accelerator applications described above primarily focused on recording high magnetic field strengths (greater than 1 Tesla). However, decreasing the laser wavelength or using a longer crystal increases the sensitivity and capability to record lower strength magnetic fields (<<1 mT). The MOS can operate in either a pulsed or continuous wave source environment. This bandwidth capability ranges from straight DC to timing resolution that is (typically) only limited by the photodetector (~100 ps or less) technology. Although the examples above describe the use of an MOS for current measurements in pulsed power accelerators, the MOS can be used in other applications, including (but not limited to) monitoring the electrical current in the energy grid system and lightning phenomenology research.

The present invention has been described as a magneto-optical sensor for magnetic field measurement. It will be understood that the above description is merely illustrative of the applications of the principles of the present invention, the scope of which is to be determined by the claims viewed in light of the specification. Other variants and modifications of the invention will be apparent to those of skill in the art.

The invention claimed is:

1. A magneto-optical sensor for magnetic field or electrical current measurement, comprising:
   a light source that provides a light beam;
   a first linear polarizer that produces a linearly polarized light beam from the light beam;
   a magneto-optical material that rotates the polarization of the linearly polarized light beam that propagates along an optical axis of the magneto-optical material to provide a rotated linearly polarized light beam whose rotation is dependent upon the strength of a magnetic field generated by an electrical current and applied parallel to the optical axis of the magneto-optical material;
   a second linear polarizer that transmits a light beam dependent upon the rotation of the polarization by the magneto-optical material; and
   a photodetector that measures the intensity of the transmitted light beam as a function of time, thereby providing a time-resolved measurement of the strength of the magnetic field.

2. The magneto-optical sensor of claim 1, wherein the light source comprises an infrared or visible laser.

3. The magneto-optical sensor of claim 2, wherein the infrared or visible laser comprises a 1550-nm or 532-nm fiber-coupled laser.

4. The magneto-optical sensor of claim 1, wherein the second linear polarizer is aligned orthogonal to the first linear polarizer.

5. The magneto-optical sensor of claim 1, wherein the magneto-optical material comprises a rare-earth-doped glass or rare-earth garnet crystal.

6. The magneto-optical sensor of claim 5, wherein the rare-earth garnet crystal comprises terbium gallium garnet or yttrium iron garnet.

7. The magneto-optical sensor of claim 1, wherein the magnetic-optical sensor is configured to measure a magnetic field or an electrical current in a vacuum transmission line of a pulsed power accelerator.

8. The magneto-optical sensor of claim 1, wherein the electric current comprises a continuous wave direct current.

9. The magneto-optical sensor of claim 1, wherein the electric current comprises a pulsed current.

* * * * *